(12) United States Patent
Saito et al.

(10) Patent No.: US 6,983,383 B1
(45) Date of Patent: Jan. 3, 2006

(54) METHOD FOR PROVIDING PRIORITY TO AN AC ADAPTOR IF THE INPUT TO THE AC ADAPTOR IS ABOVE A PREDETERMINED VALUE EVEN IF THE POWER SUPPLY VIA AN INTERFACE IS PRESENT

(75) Inventors: Shuko Saito, Kawasaki (JP); Akira Minami, Inagi (JP); Shigeyoshi Tanaka, Higashine (JP); Satoshi Furuta, Kobe (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/452,161

(22) Filed: Dec. 1, 1999

(30) Foreign Application Priority Data

Mar. 31, 1999 (JP) .......................................... 11-092500

(51) Int. Cl.
*G06F 1/26* (2006.01)

(52) U.S. Cl. ..................... 713/300; 713/323; 713/340
(58) Field of Classification Search ................. 713/300, 713/340, 323, 330
See application file for complete search history.

(56) References Cited

U.S. PATENT DOCUMENTS

| | | | | |
|---|---|---|---|---|
| 3,631,257 A | * | 12/1971 | Behr et al. ................... 307/130 |
| 4,044,268 A | * | 8/1977 | Hammel et al. .............. 307/66 |
| 5,517,153 A | * | 5/1996 | Yin et al. .................... 327/408 |
| 5,818,203 A | * | 10/1998 | Narita ......................... 320/128 |
| 5,898,234 A | * | 4/1999 | Kitagawa .................... 320/128 |
| 6,295,569 B1 | | 9/2001 | Shimura et al. | |

FOREIGN PATENT DOCUMENTS

| | | | |
|---|---|---|---|
| JP | 10108052 A | * | 4/1998 |
| JP | 10126972 A | * | 5/1998 |

OTHER PUBLICATIONS

Trotman et al, A Rechargeable and Portable AC Power Supply with the Minimum of Electronic Components, 1992 IEEE, pp. 1015–1018.*

* cited by examiner

*Primary Examiner*—Thomas Lee
*Assistant Examiner*—Suresh K Suryawanshi
(74) *Attorney, Agent, or Firm*—Staas & Halsey LLP (57) ABSTRACT

A power supply control device is provided with a first power supply input terminal to which a power supply is provided and a second power supply input terminal to which a power supply is provided. A power supply input detection unit detects an instance when the input of the second power supply input terminal is above a predetermined value and then a switch unit cuts off power supplied from the first power supply input terminal and activates power supply from the second power supply input terminal when the input from the second power supply input terminal is above a predetermined value according to the power supply input detection unit. A power supply processor processes a power supply supplied by way of the first or second power supply input terminal.

16 Claims, 5 Drawing Sheets

METHOD FOR PROVIDING PRIORITY TO AN AC ADAPTOR IF THE INPUT TO THE AC ADAPTOR IS ABOVE A PREDETERMINED VALUE EVEN IF THE POWER SUPPLY VIA AN INTERFACE IS PRESENT

BACKGROUND OF THE INVENTION

1. Field of the Invention

The present invention concerns a power supply control device to which power from a power supply is provided externally and an information processing device using the power supply control device.

2. Discussion of Related Art

Recent years have witnessed the development of increasingly miniature and highly portable information devices other than desktop and laptop computers, such as mobile computers, electronic notebooks, digital cameras and storage devices and their interconnection now allows the exchange of information.

In conjunction therewith, there is also an growing dissemination of interface specifications allowing power to be supplied, as represented by the USB (Universal Serial Bus), IEEE1394.

In the past, peripheral device units have been kept small to avoid compromising portability and power has been supplied through an AC adapter or through a power supply terminal of a host personal computer interface connector.

However, the conventional method for supplying power has almost always been either an external supply using an AC adapter or the like, a battery or by way of an interface. That is because switching between two power supply inputs requires a switch for switching, or implementation of an "or" function using a diode, which have the following drawbacks, respectively.

Switching methods involving a switch have a cost disadvantage in that a switch must be installed and that power may be lost during switching. Further, if the mode of suppling power is interrupted, operation is not possible even if power can be otherwise supplied.

Methods using a diode are problematic in that, when the voltage on the interface side is high, switching does not actually occur even if an AC adapter is connected. In particular, IEEE1394 entails a relaxed specification of the power supply voltage. A broad specification with considerable latitude stipulating from 8V to 33V, or the lack thereof, as acceptable. This has required adoption of an AC adapter with a voltage higher than that maximum value and use of circuits with high withstand voltages, for example, and measures such as the provision of high-capacity capacitors.

Figure 1:
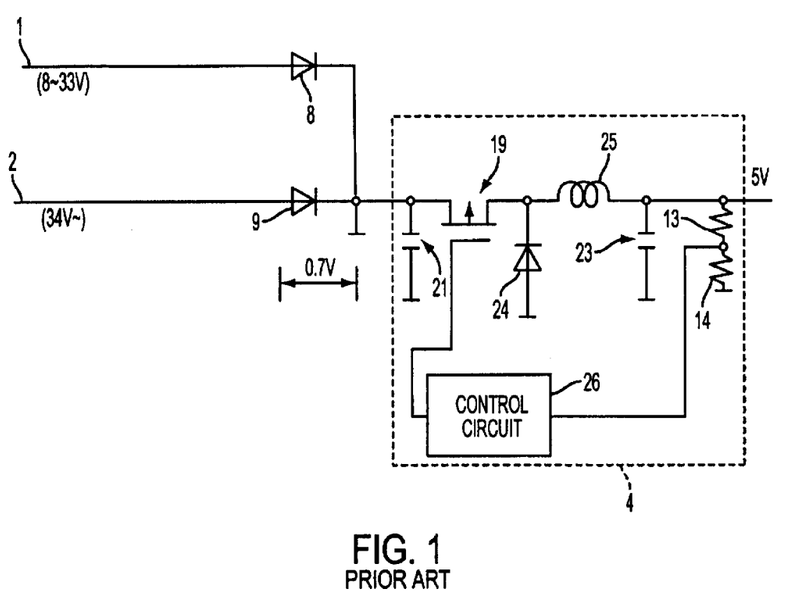
FIG. 1 is a structural drawing of conventional power supply control device.

FIG. 1 is a structural drawing of a conventional power supply control device in which 5V is supplied to an information processing unit. Power is supplied to this power supply control device from the power supply terminal of an interface connector and from an AC adapter by way of respective signal lines 1, 2. The power supply voltage supplied from the interface connector is set in the range of 8V–33V, according to the personal computer, or the like, connected thereafter. The power supply voltage supplied from the AC adapter is greater than 34V.

Backflow prevention diodes 8, 9 are provided in the signal lines 1, 2, preventing current flowing from one line from flowing back into the other line. Thus, the power supply voltage is supplied to a power supply circuit 4 from the line with the higher voltage.

The power supply circuit 4 comprises a field effect transistor 19, which performs switching, a flywheel diode 24, a coil 25, output voltage feedback resistors 13, 14, a decoupling capacitor 21, a smoothing capacitor 23 and a control circuit 26.

The output voltage from the power supply circuit 4 is divided by resistors 13, 14. Based on the result of a comparison to a predetermined reference voltage, the control circuit 26 issues instructions for switching to the field effect transistor 19 and standardizing feedback control is thereby carried out to provide a 5V output voltage.

In such a power supply control device, when the power is supplied from the interface signal line 1, and not from the adapter signal line 2, current flows from the interface signal line 1 into the decoupling capacitor 21 and is prevented from flowing into the adapter signal line by a backflow prevention diode 9.

When the power supply voltage from the interface signal line 1 is 33V, even though power is supplied from the adapter signal line 2, if a higher power supply voltage is not supplied, current flows from the interface signal line 1 to the decoupling capacitor 21.

Essentially, when 8V–33V is supplied from the interface, a voltage higher than the 33V, that is the maximum voltage supplied from the interface, is required to ensure that when an AC adapter is used, no power is received from the interface and the current received comes only from the AC adapter. Thus, accounting for error in precision, a voltage greater than 34V is required.

Because the relationship between the withstand voltage and the capacity of a capacitor is generally proportional, the smoothing capacitor within the AC adapter must also be increased. The slim likelihood of increasing the conversion efficiency of the power supply for conversion from 34V to 5V is also a problem.

SUMMARY OF THE INVENTION

Consequently, an object of the present invention is to provide a power supply control device and an information processing device which reduces the wear of a host computer, or other such battery, connected by way of an interface connector. This object is achieved by receiving a prioritized power supply when power is provided by a dedicated power supply source, which supplies power only from an AC adapter, or other such power supply.

Another object of the present invention is to provide a power supply control device and an information processing device which do not entail an unnecessary increase in the power supply voltage of an AC adapter, or other such power supply source, and to allow the use of a small, inexpensive power supply source.

Additional objects and advantages of the present invention will be set forth in part in the description which follows, and in part, will be obvious from the description, or may be learned by practice of the invention.

The power supply control device and information processing device using such possess an interface that receives or transmits information from or to another information processing device and is provided with a predetermined power supply. The aforementioned power supply control device is provided with a first power supply input terminal to which a power supply is provided by way of the aforementioned interface. Also provided is a second power supply input terminal to which a power supply is provided by way of another power supply source other than the aforementioned interface. A power supply input detection unit detects an instance when the input of the aforementioned second power supply input terminal is above a predetermined value. A switch unit cuts off the power supplied from the aforementioned first power supply input terminal and activates the power supply from the aforementioned second power supply input terminal when the input from the aforementioned second power supply input terminal is above a predetermined value, according to the aforementioned power supply input detection unit. A power supply processor processes the power supplied by way of the first or second power supply input terminals. In addition, the first power supply input terminal is connected to an interface power supply and the second power supply input terminal is connected to an AC adapter.

The switch unit is provided with a switch which activates or deactivates the power supplied from the first power supply input terminal. A switch control unit drives a switch to cut off the power supplied from the first power supply input terminal when the power supplied from the second power supply input terminal is more than a predetermined value according to a result from the power supply input detection unit.

In addition, a backflow prevention unit is provided in the power supply lead from the first power supply input terminal and the second power supply input terminal, respectively.

The switch unit is also provided with a first switch, which activates or deactivates the power supplied from the first power supply input terminal and a second switch, which activates or deactivates the power supplied from the second power supply input terminal. Also provided is a switch control unit which drives one switch and thereby activates the power supply from the first power supply input terminal when there is no power supplied from the second power supply input terminal, according to a result from the power supply input detection unit, and drives another switch to activate a power supply from the second power supply input terminal when the power supplied is greater than a predetermined value from the second power supply input terminal. In addition, the switch comprises a field effect transistor and the aforementioned interface is a USB-specified or IEEE-specified interface.

The aforementioned information processing device of the present invention is a storage device which processes a disk, card, or tape form of a storage medium.

Accordingly, there is means which detects a high priority voltage from among two power supply inputs and means which cuts off the lower priority power supply input. Cutting off the lower priority power supply input by means of the output from the voltage detection means allows power to be automatically supplied from the higher priority power supply input terminal.

In addition, by using an AC adapter or other such power supply source whenever available and using an interface connector only when power is interrupted, the present invention provides an information processing device which does not unnecessarily wear the battery of a host computer.

In addition, without needlessly raising the voltage of an AC adapter, the present invention can also be formed compactly and inexpensively.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 2:
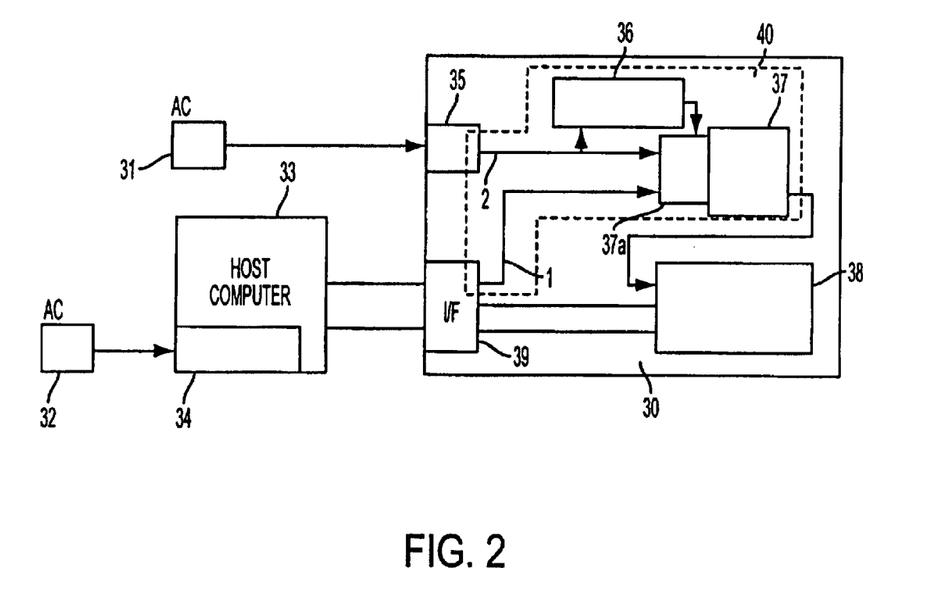
FIG. 2 is a structural drawing of the information processing device system of the present invention.

FIG. 2 is a structural drawing of an information processing device system. The information processing device 30 is supplied by, as an external power supply, an AC adapter 31 and by a power supply stored in the battery 34 of a host computer 33 powered by a battery 34 or an AC adapter 32 and provided by way of an interface by means of power supply leads 1, 2.

Power supply from the host computer 33 is accomplished by connection of the power supply lead of a detachable interface connector (I/F) to a first power supply input terminal at a device interface 39. Power supply from the AC adapter 31 is accomplished by connection of a detachable connector to a second power supply input terminal 35.

Though the present preferred embodiment describes an instance using an IEEE1394-specified interface connector, items possessing a power supply lead or power supply terminal designated by IEEE specifications, USB specifications, or ISO specifications can also be used. A USB-specified interface provides a 5V power supply.

Voltage supplied by way of the first and second power supply input terminals 39, 35, respectively, is supplied to a power supply processor 37 in the power supply control device 40. Provision of a power supply input detector 36 to detect when the input from the second power supply input terminal 35 is above a predetermined value, affords a structure switched by a switching unit 37a such that supplied power is received with priority from the AC adapter 31 when a predetermined power supply from the AC adapter 31 is present.

The power supply processor 37 outputs a predetermined 5V power supply voltage, which is supplied to an information processing unit 38. The information processing unit 38, that is the device to which power is ultimately supplied, may be an opto-magnetic disk device, which is both an optical storage device and a computer storage device, a phase change optical disk device, a DVD device, a CD-ROM/CD-R/CD-RW device, an optical card device, a floppy disk device, a hard disk device, a magnetic disk device, a magnetic card device, a magnetic tape device or an optical tape device, or the like. A mobile phone or a portable and compact terminal such as a notebook personal computer, pocket personal computer, electronic notebook or electronic book may also be used.

Figure 3:
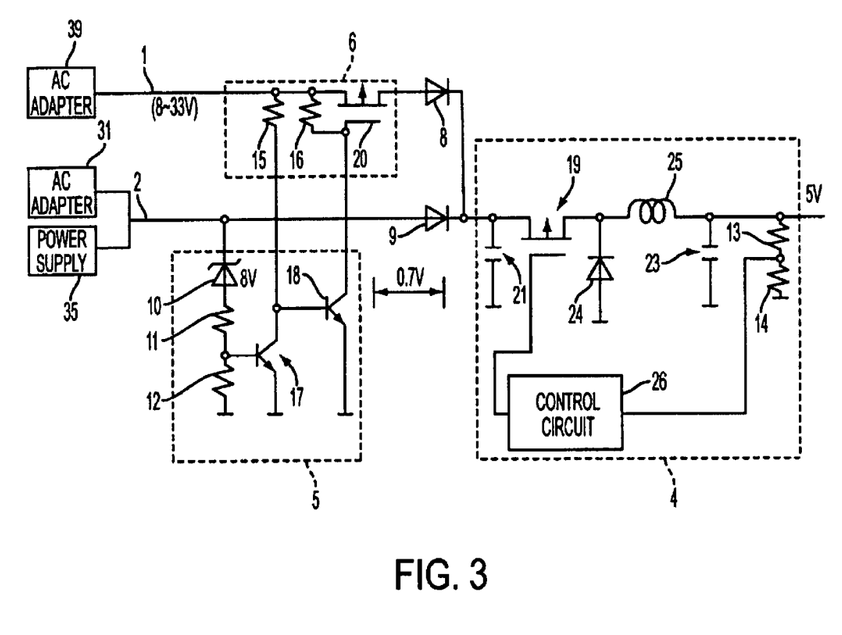
FIG. 3 is a structural drawing of a first preferred embodiment of the power supply control device of the present invention.

FIG. 3 is a structural drawing of a first preferred embodiment of the power supply control device of the present invention. Voltage supplied by an AC adapter 31 is detected by a voltage detection unit 5 comprising a power supply input detection unit. Voltage detection unit 5 comprises a Zener diode 10, resistors 11, 12; and transistors 17, 18. A switch unit 6 comprises resistors 15, 16 and a field effect transistor 20. Backflow prevention diodes 8, 9 are provided in the signal lines 1, 2, respectively and prevent current flowing from one direction from flowing backwards in the other direction.

A power supply circuit 4 comprises a field effect transistor 19 which performs switching, a flywheel diode 24, a coil 25, output voltage feedback resistors 13, 14, a decoupling capacitor 21, a smoothing capacitor 23 and a control circuit 26.

The output voltage from the power supply circuit 4 is divided by resistors 13, 14 based on the result of a comparison to a predetermined reference voltage. The control circuit 26 issues instructions for switching to the field effect transistor 19 and standardizing feedback control is thereby carried out to provide a 5V output voltage.

In the voltage detection unit 5, when the Zener diode 10 detects that the flow of current supplied from the AC adapter 31 and input by way of the second power supply input terminal 35 has a voltage exceeding 8V, a transistor 17 switches ON. When this transistor 17 switches ON, another transistor 18 switches OFF. When that transistor 18 switches OFF, the gate voltage of the field effect transistor 20 in the switch unit 6 is no longer applied and the voltage supplied from the interface and input by way of the first power supply input terminal 39 is cut off. Here, the transistors 17, 18 and resistors 15, 16 make up a switch control unit that operates as a switch.

Thus, the only supply to the power supply circuit 4 is the input from the AC adapter 31. Conversely, if the supply from the AC adapter 31 is interrupted and the voltage falls below 8V, a transistor 17 switches OFF instantly, another transistor 18 switches ON, the gate voltage of the field effect transistor 20 falls below the source voltage and conducting status is achieved. Then, switchover occurs to supply power from the interface input by way of the first power supply input terminal 39. Thus, the power supply source can be made switchable simply by setting the AC adapter to greater than 8V.

Figure 4:
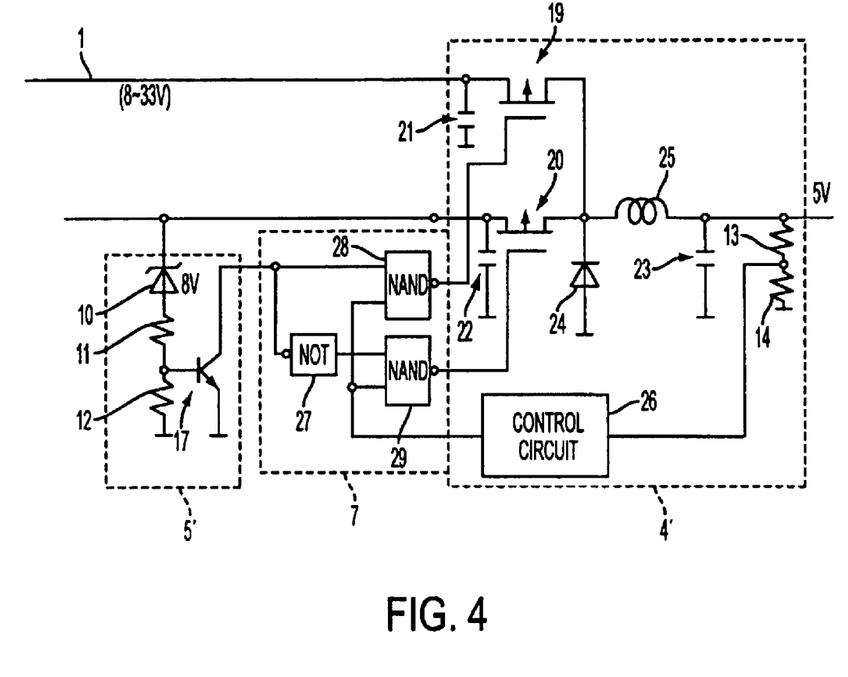
FIG. 4 is a structural drawing of a second preferred embodiment of the power supply control device of the present invention.

FIG. 4 is a structural drawing of a second preferred embodiment of the power supply control device pertaining to the present invention. Voltage supplied by an AC adapter 31 is detected by a voltage detection unit 5' comprising a power supply input detection unit. Voltage detection unit 5' comprises a Zener diode 10, resistors 11, 12, and transistors 17, 18. A switch unit comprises a switch control unit 7 and a switch located within a power supply circuit 4'.

The switch control unit 7 includes a NOT circuit 27 and NAND circuits 28, 29. The power supply circuit 4' comprises field effect transistors 19, 20 which include switches, a flywheel diode 24, a coil 25, output voltage feedback resistors 13, 14, a decoupling capacitor 21, a smoothing capacitor 23 and a control circuit 26.

The output voltage from the power supply circuit 4' is divided by resistors 13, 14 and a comparison to a predetermined reference voltage is performed. Based on that result, the control circuit 26 outputs a signal to the NAND circuits 28, 29, and standardizing feedback control is carried out to provide a 5V output voltage by instructing switching of the field effect transistors 19, 20.

In the voltage detection unit 5', when the Zener diode 10 detects that the flow of current supplied from the AC adapter 31 and input by way of the second power supply input terminal 35 has a voltage exceeding 8V, a transistor 17 switches ON. When this transistor 17 switches ON, a signal is input to the NOT circuit 27 and a NAND circuit 29 in the switch control unit 7, a field effect transistor 20 comprising a switch falls below the source voltage and conducting status is achieved. Thus, power is supplied from the AC adapter 31 and input by way of the second power supply input terminal 35. Hence, the only supply to the power supply circuit 4 is the input from the AC adapter 31.

Conversely, if the supply from the AC adapter 31 is interrupted and the voltage falls below 8V, a transistor 17 switches OFF instantly, a signal is input to a NAND circuit 28, the gate voltage of the field effect transistor 19 comprising a switch falls below the source voltage and conducting status is achieved. Thus, switchover occurs to supply power from the interface input by way of the first power supply input terminal 39. Hence, the power supply source can be made switchable simply by setting the AC adapter 31 to greater than 8V.

Essentially, in the present preferred embodiment, by duplicating the power supply circuit switching elements themselves and exercising selective control through a voltage detection unit signal, backflow prevention diodes are eliminated and the loss resulting from their voltage drop (approximately 0.7V) is reduced.

This 0.7V is the junction voltage of a junction-type diode and is generally on the order of 0.5V to 1V, but for the most part approximates 0.7V. This results in a voltage drop during current flow in the forward direction of the diode, leading to a corresponding loss of power.

Figure 5:
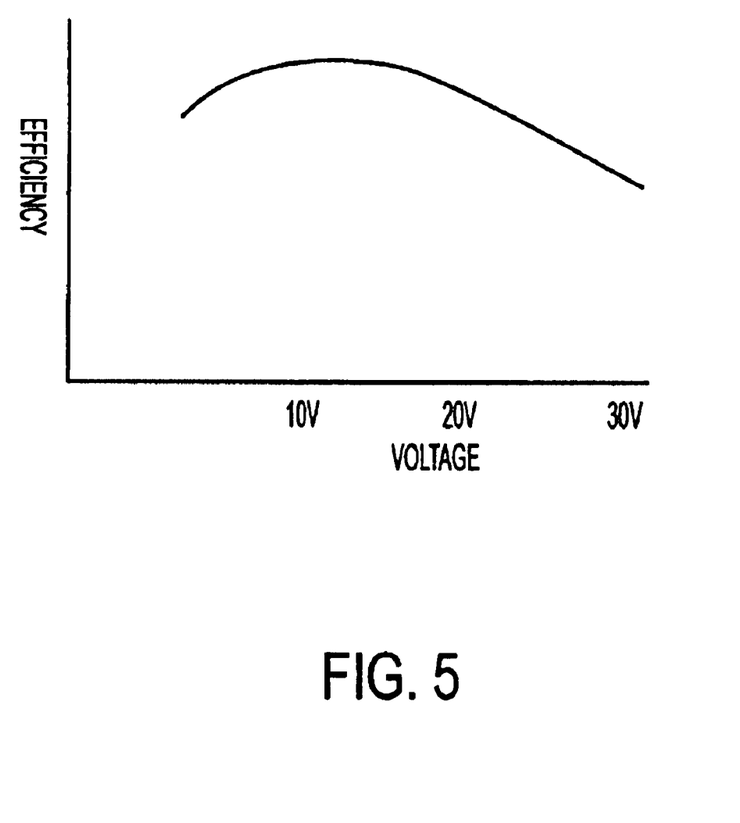
FIG. 5 is a drawing depicting the input voltage of a power supply circuit and an efficiency curve.

FIG. 5 is a drawing depicting an input voltage-efficiency curve which indicates switching efficiency with respect to the input voltage of the power supply input circuit. In FIG. 5, the highest efficiency is at 12V–15V and the use of the above-described power supply control device affords selection of the AC adapter. This results in a highly efficient voltage. Precision is also not required in AC adapter output at this level of voltage, which allows the use of a very inexpensive AC adapter.

Efficiency is also poor at 34V and, thus, in lieu of using an expensive AC adapter in the above-discussed conventional power supply control device, the present invention solves the problem of poor power supply efficiency.

Though the foregoing preferred embodiment discussed power supplied from an AC adapter and an interface, application is also possible in an instance such as prioritized receipt from one of two interfaces supplying power. In addition, other than an AC adapter, a battery provided in an information processing device is also an acceptable power supply source.

Detection of power supply input from a power supply source subject to prioritized receipt and performance of power supply switching is also acceptable. Selection among a plurality of more than two power supply sources may also be afforded. Thus, the present invention allows assignment of priority with respect to multiple power supply inputs and can afford automatic selection without impairing the degree of freedom of voltage in those power supply inputs.

"Degree of freedom of voltage" refers to the ability to design a voltage best suited to considerations such as energy efficiency, economics and mass production effects, without limitations placed on voltage design values by secondary restrictions.

The power supply control device can also be formed on a printed circuit board and a first and second power supply input terminal can be provided on the printed circuit board. A design can also be created entailing connection, either directly between connectors or by way of an FPC, from the printed circuit board to a power supply circuit on the control circuit board of a storage device or other such information processing unit.

Additionally, though in the foregoing preferred embodiment the power supply voltage supplied to an information processing unit was set at 5V and the detection voltage was set at greater than 8V, it is naturally the case that the power supply voltage supplied to an information processing unit can be modified to suit that specific unit. Specifically, the power supply voltage supplied to a power supply processing unit can be set at 3.5V and the detection voltage can be set at 5V.

As described above, the power supply control device and information processing device pertaining to the present invention, through a simple structure, allows the receipt of power from a high priority power supply input among a plurality of power supply inputs. Thus, a power supply from a dedicated power supply source such as an AC adapter can automatically be received in a prioritized fashion, thereby affording a reduction in the wear of an interface-connected host, or the like, from a power supply.

By connecting a power supply such as an AC adapter, a user obviates the need to receive power from another information processing device through an interface, which is particularly beneficial in the case of a portable battery-driven notebook personal computer, or the like where it is desirable that the connection reduce battery wear as much as possible.

In addition, the power supply control device and information processing device pertaining to the present invention do not require the use of a large, high-precision and expensive AC adapter, allowing the use of a small and inexpensive AC adapter.

What is claimed is:

1. A power supply control device comprising:
   a first power supply input terminal to which a power supply is provided via an interface;
   a second power supply input terminal to which a power supply is provided via an AC adaptor;
   a power supply input detection unit determining whether an input of said second power supply input terminal is above a predetermined value;
   a switching unit cutting off power supplied by said first power supply input terminal via the interface, and activating a power supplied by said second power supply input terminal via the AC adaptor if the input to said second power supply input terminal is above the predetermined value even if the input to said second power supply input terminal via the interface is present; and
   a power supply processor processing the power supplied by one of said first or second power supply input terminals.

2. The power supply control device according to claim 1, wherein said switching unit comprises:
   a switch activating or deactivating the power supplied by said first power supply input terminal; and
   a switch control unit driving the switch thereby cutting off the power supplied by said first power supply input terminal if the power supplied by said second terminal is greater than the predetermined value.

3. The power supply control device according to claim 2, wherein a backflow prevention unit is disposed in a power supply lead from said first power supply input terminal and a power supply lead from said second power supply input terminal.

4. The power supply control device according to claim 1, wherein said switching unit comprises:
   a first switch activating or deactivating the power supplied by said first power supply input terminal;
   a second switch which activating or deactivating the power supplied by said second power supply input terminal; and
   a switch control unit driving one of the first and second switches, thereby activating the power supplied by said first power supply input terminal when there is no power supplied by said second power supply input terminal according to a result from said power supply input detection unit, and driving the other of the first and second switches, thereby activating the power supplied by said second power supply input terminal when the power supplied by said second power supply input terminal is greater than the predetermined value.

5. The power supply control device according to claim 2, wherein the switch comprises a field effect transistor.

6. An information processing device having an interface which receives or transmits information to and from another information processing device and a power supply control device to which a predetermined power supply is provided, comprising:
   a first power supply input terminal to which a power supply is provided via said interface;
   a second power supply input terminal to which a power supply is provided via an AC adaptor;
   a power supply input detection unit which detects an instance when the input of said second power supply input terminal via the AC adaptor is above a predetermined value;
   a switch unit which cuts off a power supply from said first power supply input terminal via the interface and activates a power supply from said second power supply input terminal via the AC adaptor when the input from said second power supply input terminal is above the predetermined value according to said power supply input detection unit even if the input to said second power supply input terminal via the interface is present; and
   a power supply processor which, for the predetermined power supply, processes the power supply supplied via said first or second power supply input terminals.

7. The information processing device according to claim 6, wherein said switch unit comprises:
   a switch which activates or deactivates a power supply from said first power supply input terminal; and
   a switch control unit which drives the switch and thereby cuts off a power supply from said first power supply input terminal when there is a supply of more than the predetermined value from said second power supply input terminal according to a result from said power supply input detection unit.

8. The information processing device according to claim 7, wherein a backflow prevention unit is disposed in a power supply lead from said first power supply input terminal and said second power supply input terminal, respectively.

9. The information processing device according to claim 6, wherein said switch unit comprises:
   a first switch which activates or deactivates the power supply from said first power supply input terminal;
   a second switch which activates or deactivates the power supply from said second power supply input terminal; and
   a switch control unit which drives one switch and thereby activates the power supply from said first power supply input terminal when there is no power supply from said second power supply input terminal according to a result from said power supply input detection unit, and which drives another switch and thereby activates the power supply from said second power supply input terminal when the power supplied by said second power supply input terminal is greater than the predetermined value.

10. The information processing device according to claim 7, wherein said switch comprises a field effect transistor.

11. The information processing device according to claim 6, wherein the interface is a USB-specified or an IEEE-specified interface.

12. The information processing device according to claim 6, wherein the information processing device is a storage device which processes a disk form, card form or tape form of a storage medium.

13. A power supply control device comprising:
   a first power supply input terminal to which a power supply is provided via an interface;
   a second power supply input terminal to which a power supply is provided via an AC adaptor;
   a detection unit determining whether an input of said second power supply input terminal is above a predetermined value; and
   a switching unit cutting off power supplied by said first input terminal via the interface and activating a power supplied by said second input terminal via the AC adaptor if the input to said second input terminal is above the predetermined value even if the input to said second power supply input terminal via the interface is present.

14. A method of controlling a power supply control device comprising:
   providing a power supply to first and second power supply input terminals via an interface and AC adaptor, respectively;
   determining whether an input of the second power supply input terminal via the AC adaptor is above a predetermined value; and
   switching off power supplied by the first input terminal via the interface and activating a power supplied by the second input terminal via the AC adaptor if the input to the second input terminal is above the predetermined value even if the input to said second power supply input terminal via the interface is present.

15. A power supply control device, comprising:
   a first and second power supply input terminal to which a power supply is provided via an interface and adaptor, respectively; and
   a switching unit to cut off power supplied by the first input terminal via the interface and activating a power supplied by the second input terminal via the adaptor if the input to said second input terminal is above a predetermined value even if the input to the second power supply input terminal via the interface is present.

16. A method of controlling a power supply control device comprising:
   providing a power supply to first and second power supply input terminals via an interface and adaptor, respectively; and
   cutting off power supplied by the first input terminal via the interface and activating a power supplied by the second input terminal via the adaptor if the input to the second input terminal is above a predetermined value even if the input to the second power supply input terminal via the interface is present.

* * * * *

UNITED STATES PATENT AND TRADEMARK OFFICE
CERTIFICATE OF CORRECTION

| | |
|---|---|
| PATENT NO. | : 6,983,383 B1 |
| APPLICATION NO. | : 09/452161 |
| DATED | : January 3, 2006 |
| INVENTOR(S) | : Shuko Saito |

It is certified that error appears in the above-identified patent and that said Letters Patent is hereby corrected as shown below:

Title Page, Column 2 (Foreign Patent Documents), Line 1, after "4/1998" insert -- H04N 05/225 --.
Title Page, Column 2 (Foreign Patent Documents), Line 2, after "5/1998" insert --H02J 07/02 --.
Title Page, Column 2 (Other Publications), Line 2, delete "et al," and insert -- et al., -- therefor.
Column 7, Line 35, after "interface" delete ";" and insert -- power supply -- therefor.
Column 7, Line 42, delete "interface," and insert --interface power supply, -- therefor.
Column 7, Line 46, delete "second" and insert -- first -- therefor.
Column 7, Line 47, delete "interface" and insert -- interface power supply -- therefor.
Column 8, Line 25, after "interface" delete ";" and insert -- power supply; -- therefor.
Column 8, Line 33, delete "interface" and insert -- interface power supply -- therefor.
Column 8, Line 39, delete "second" and insert -- first -- therefor.
Column 8, Line 39, delete "interface" and insert -- interface power supply -- therefor.
Column 9, Line 20, after "interface" delete ";" and insert -- interface power supply; -- therefor.
Column 9, Line 27, delete "interface" and insert -- interface power supply -- therefor.
Column 9, Line 32, delete "second" and insert -- first -- therefor.
Column 9, Line 32, delete "interface" and insert -- interface power supply -- therefor.
Column 10, Line 2, delete "interface" and insert -- interface power supply -- therefor.
Column 10, Line 8, delete "interface" and insert -- interface power supply -- therefor.
Column 10, Line 11, delete "second" and insert -- first -- therefor.
Column 10, Line 12, delete "interface" and insert -- interface power supply -- therefor.
Column 10, Line 15, delete "interface" and insert -- interface power supply -- therefor.
Column 10, Line 18, delete "interface" and insert -- interface power supply -- therefor.
Column 10, line 20, delete "second" and insert -- first -- therefor.
Column 10, Line 21, delete "interface" and insert -- interface power supply -- therefor.
Column 10, Line 26, delete "interface" and insert -- interface power supply -- therefor.
Column 10, Line 29, delete "interface" and insert -- interface power supply -- therefor.

UNITED STATES PATENT AND TRADEMARK OFFICE
CERTIFICATE OF CORRECTION

PATENT NO. : 6,983,383 B1
APPLICATION NO. : 09/452161
DATED : January 3, 2006
INVENTOR(S) : Shuko Saito It is certified that error appears in the above-identified patent and that said Letters Patent is hereby corrected as shown below:

Column 10, line 32, delete "second" and insert -- first -- therefor.
Column 10, Line 33, delete "interface" and insert -- interface power supply -- therefor.

Signed and Sealed this

Nineteenth Day of February, 2008

JON W. DUDAS
*Director of the United States Patent and Trademark Office*